United States Patent
Apted

(10) Patent No.: US 9,053,529 B2
(45) Date of Patent: Jun. 9, 2015

(54) SYSTEM AND METHOD FOR CAPTURING DIGITAL IMAGES

(75) Inventor: Trent Apted, Kingsford (AU)

(73) Assignee: Smart Internet CRC PTY LTD, Eveleigh, NSW (AU)

( * ) Notice: Subject to any disclaimer, the term of this patent is extended or adjusted under 35 U.S.C. 154(b) by 764 days.

(21) Appl. No.: 12/677,765

(22) PCT Filed: Sep. 11, 2008

(86) PCT No.: PCT/AU2008/001344
§ 371 (c)(1),
(2), (4) Date: Jun. 23, 2010

(87) PCT Pub. No.: WO2009/033218
PCT Pub. Date: Mar. 19, 2009

(65) Prior Publication Data
US 2010/0295869 A1      Nov. 25, 2010

(30) Foreign Application Priority Data

Sep. 11, 2007    (AU) ................................ 2007904929

(51) Int. Cl.
| | |
|---|---|
| *G09G 5/00* | (2006.01) |
| *G06T 1/00* | (2006.01) |
| *G06F 3/00* | (2006.01) |
| *G06F 3/042* | (2006.01) |
| *G06F 3/0484* | (2013.01) |

(52) U.S. Cl.
CPC .............. *G06T 1/0007* (2013.01); *G06F 3/005* (2013.01); *G06F 3/0425* (2013.01); *G06F 3/04845* (2013.01); *G06F 3/04842* (2013.01)

(58) Field of Classification Search
USPC .................................................. 345/619, 633
See application file for complete search history.

(56) References Cited

U.S. PATENT DOCUMENTS

| | | | |
|---|---|---|---|
| 5,016,194 A | | 5/1991 | Matsushita et al. |
| 5,241,625 A | * | 8/1993 | Epard et al. ................... 345/502 |
| 5,341,466 A | * | 8/1994 | Perlin et al. ................... 345/668 |
| 5,801,699 A | | 9/1998 | Hocker |

(Continued)

FOREIGN PATENT DOCUMENTS

| | | |
|---|---|---|
| AU | 2003285781 | 7/2004 |
| AU | 2004304946 | 7/2005 |

(Continued)

OTHER PUBLICATIONS

Techsmith: "SnagIt User's Guide, Capture and Share Anything on Your Screen" Internet Citation 2003, XP 002354973, Retrieved from the Internet: URL: ftp://ftp.techsmith.com/Pub/products/snagit/63/snagitug.pdf, retrieved Nov. 18, 2005.

(Continued)

*Primary Examiner* — M Good Johnson
(74) *Attorney, Agent, or Firm* — Workman Nydegger

(57) ABSTRACT

The present invention provides system for capturing displayed digital images. The system includes a selection tool utilisable by a user to select at least one portion of at least one displayed image; and, a capture routine arranged to reproduce the selected portion. If the selection tool selects only a portion of one image, then the captured image is sourced from a secondary storage source and if the selection tool selects more than one portion of one image, then the captured image is sourced from a primary storage source.

29 Claims, 5 Drawing Sheets

(56) References Cited

U.S. PATENT DOCUMENTS

| | | | | |
|---|---|---|---|---|
| 5,801,700 | A | 9/1998 | Ferguson | |
| 5,874,962 | A | 2/1999 | de Judicibus | |
| 5,877,762 | A * | 3/1999 | Young | 715/803 |
| 5,887,081 | A | 3/1999 | Bantum | |
| 5,977,974 | A | 11/1999 | Hatori | |
| 6,011,537 | A * | 1/2000 | Slotznick | 715/733 |
| 6,133,914 | A * | 10/2000 | Rogers et al. | 345/661 |
| 6,408,301 | B1 * | 6/2002 | Patton et al. | 707/741 |
| 6,414,672 | B2 * | 7/2002 | Rekimoto et al. | 345/173 |
| 6,510,553 | B1 * | 1/2003 | Hazra | 725/87 |
| 6,542,192 | B2 * | 4/2003 | Akiyama et al. | 348/333.11 |
| 6,590,593 | B1 | 7/2003 | Robertson | |
| 6,727,906 | B2 | 4/2004 | Lockeridge | |
| 6,819,267 | B1 | 11/2004 | Edmark | |
| 6,880,132 | B2 | 4/2005 | Uemura | |
| 6,978,472 | B1 | 12/2005 | Nashida | |
| 7,065,716 | B1 | 6/2006 | Rzepkowski et al. | |
| 7,102,639 | B2 | 9/2006 | Oka | |
| 7,168,813 | B2 | 1/2007 | Wong | |
| 7,197,535 | B2 * | 3/2007 | Salesky et al. | 709/204 |
| 7,394,459 | B2 | 7/2008 | Bathiche | |
| 7,395,515 | B2 | 7/2008 | Konar | |
| 7,480,873 | B2 | 1/2009 | Kawahara | |
| 7,519,223 | B2 * | 4/2009 | Dehlin et al. | 382/203 |
| 7,535,463 | B2 * | 5/2009 | Wilson | 345/175 |
| 7,706,634 | B2 * | 4/2010 | Schmitt et al. | 382/294 |
| 7,907,128 | B2 * | 3/2011 | Bathiche et al. | 345/175 |
| 8,018,579 | B1 * | 9/2011 | Krah | 356/4.01 |
| 8,111,239 | B2 | 2/2012 | Pryor | |
| 8,230,359 | B2 | 7/2012 | Robertson | |
| 8,661,348 | B2 * | 2/2014 | Wollmershauser et al. | 715/744 |
| 8,677,284 | B2 | 3/2014 | Aguilar | |
| 2002/0033849 | A1 | 3/2002 | Loppini | |
| 2002/0051063 | A1 | 5/2002 | Hwang | |
| 2003/0093466 | A1 | 5/2003 | Jarman et al. | |
| 2004/0070608 | A1 | 4/2004 | Saka | |
| 2004/0150646 | A1 | 8/2004 | Oka | |
| 2005/0052427 | A1 | 3/2005 | Wu et al. | |
| 2005/0132299 | A1 | 6/2005 | Jones et al. | |
| 2005/0140696 | A1 | 6/2005 | Buxton | |
| 2005/0280631 | A1 * | 12/2005 | Wong et al. | 345/158 |
| 2006/0002315 | A1 * | 1/2006 | Theurer et al. | 370/261 |
| 2006/0010392 | A1 | 1/2006 | Noel et al. | |
| 2006/0023078 | A1 * | 2/2006 | Schmitt et al. | 348/222.1 |
| 2006/0031786 | A1 | 2/2006 | Hillis | |
| 2006/0125799 | A1 | 6/2006 | Hillis et al. | |
| 2006/0136828 | A1 | 6/2006 | Asano | |
| 2006/0140508 | A1 | 6/2006 | Ohgishi et al. | |
| 2006/0241864 | A1 | 10/2006 | Rosenberg | |
| 2006/0253797 | A1 * | 11/2006 | Madan et al. | 715/792 |
| 2006/0274046 | A1 | 12/2006 | Hillis et al. | |
| 2007/0014460 | A1 | 1/2007 | Kuziela et al. | |
| 2007/0046643 | A1 | 3/2007 | Hillis et al. | |
| 2007/0146347 | A1 | 6/2007 | Rosenberg | |
| 2007/0157101 | A1 | 7/2007 | Indiran | |
| 2007/0234226 | A1 | 10/2007 | Szeto | |
| 2008/0024444 | A1 | 1/2008 | Abe | |
| 2008/0065996 | A1 | 3/2008 | Noel et al. | |
| 2008/0222540 | A1 | 9/2008 | Schulz | |
| 2008/0229222 | A1 | 9/2008 | Kake | |
| 2009/0100343 | A1 | 4/2009 | Lee | |
| 2009/0122018 | A1 | 5/2009 | Vymenets et al. | |
| 2010/0241979 | A1 | 9/2010 | Apted | |
| 2010/0271398 | A1 | 10/2010 | Apted | |
| 2010/0281395 | A1 | 11/2010 | Apted | |
| 2011/0239129 | A1 | 9/2011 | Kummerfeld | |
| 2012/0143991 | A1 | 6/2012 | Collins | |

FOREIGN PATENT DOCUMENTS

| | | | |
|---|---|---|---|
| AU | 2008299577 | | 5/2012 |
| AU | 20080299576 | | 6/2012 |
| AU | 20080299579 | | 6/2012 |
| CA | 2548724 | | 7/2005 |
| DE | 10353785 | | 6/2005 |
| DE | 102006012976 | | 7/2007 |
| EP | 0235902 | B1 | 7/1991 |
| EP | 0572228 | | 12/1993 |
| EP | 0368664 | B1 | 6/1995 |
| EP | 1573678 | | 9/2005 |
| EP | 1685384 | | 8/2006 |
| EP | 1695195 | | 8/2006 |
| EP | 1913574 | | 4/2008 |
| EP | 1952221 | | 8/2008 |
| EP | 08799989.2 | | 10/2011 |
| GB | 2347834 | | 9/2000 |
| JP | 62219179 | | 9/1987 |
| JP | 2130164 | | 5/1990 |
| JP | H11-345060 | | 2/1998 |
| JP | 0853426 | | 7/1998 |
| JP | 2004-078488 | | 8/2002 |
| JP | 2002-140147 | | 2/2003 |
| JP | 2004213641 | | 7/2004 |
| JP | 2005100391 | | 4/2005 |
| JP | 2006-172193 | | 6/2006 |
| JP | 2006172193 | | 6/2006 |
| JP | 2010-524307 | | 11/2008 |
| JP | 2010-524305 | | 8/2012 |
| JP | 2010-524306 | | 10/2012 |
| WO | WO9306691 | | 4/1993 |
| WO | WO2004057540 | | 7/2004 |
| WO | WO2005050175 | | 6/2005 |
| WO | WO2005060544 | | 7/2005 |
| WO | WO2006017695 | | 2/2006 |
| WO | WO2007014082 | | 2/2007 |
| WO | WO2007061839 | | 5/2007 |
| WO | WO2009033216 | | 3/2009 |
| WO | WO2009033217 | | 3/2009 |
| WO | WO2009033218 | | 3/2009 |
| WO | WO2009033219 | | 3/2009 |

OTHER PUBLICATIONS

Extended European Search Report from PCT/AU2008/001344 completed Nov. 8, 2010.

Otmar Hilliges et al., "Photohelix: Browsing, Sorting and Sharing Digital Photo Collections, Horizontal Interactive Human-Computer Systems", TABLETOP '07, Second Annual IEEE International Workshop Oct. 2007, pp. 87-94.

Jingyu Cui et al., "Easy Album: An Interactive Photo Annotation System Based Annotation System Based on Face Clustering and Re-ranking, Conference on Human Factors in Computing Systems Archive", Proceedings of SIGCHI Conference on Human Factors in Computing Systems, CHI 2007, Apr. 28-May 3, 2007, San Jose, CA, USA.

Everitt K et al.: "MultiSpace: Enabling Electronic Document Micromobility in Table-Centric, Multi-Device Environments", Horizontal Interactive Human-Computer Systems, 2006. TableTop 2006. First IEEE International Workshop on Adelaide, South Australia Jan. 5-7, 2006, Piscataway, NJ, USA, IEEE, Jan. 5, 2006, pp. 27-34, ISBN: 978-0-7695-2494-8.

Scott S D et al: "Storage Bins: Mobile Storage for Collaborative Tabletop Displays", IEEE Computer Graphics and Applications, IEEE Service Center, New York, NY, US, vol. 25, No. 4, Jul. 1, 2005 pp. 58-65, ISSN: 0272-1716.

International Search Report cited in International Application No. PCT/AU2010/0008323 dated Aug. 23, 2010.

Montferrat, P., Apostolopoulou, A., Besacier, G., Buisine, S., Rey, G., Vernier, F. (2007). Brainstorming and mind-mapping on DiamondTouch: Creativity unleashed. (1 page) (the month of Publication is irrelevant as the year of Publication is clearly prior to the filing of the Application).

Hilliges, Otmar "Designing for Collaborative Creative Problem Solving" Jun. 13-15, 2007, Washington DC, USA (10 pages).

Christensen, Brett, "Relocate theWindows Taskbar," May 6, 2006, Available http://web.archive.org/web/20060506163826/http://www.sp-tips.com/relocate-taskbar.html.

Hilliges, Otmar, Banr, Dominikus, Butz, Andreas "Photohelix:Browsing, Sorting and Sharing Digital Photo Collections" 9 pages, Oct. 2007; Media Informatics Group, University of Munich, Germany.

(56) References Cited

OTHER PUBLICATIONS

U.S. Appl. No. 12/677,760, filed Feb. 9, 2012, Office Action.
U.S. Appl. No. 12/677,756, filed Sep. 14, 2012, Office Action.
U.S. Appl. No. 12/677,760, filed Oct. 11, 2012, Final Office Action.
Office Action for Corresponding Australian Application No. 20085299576 dated Jun. 12, 2012.
Office Action for Corresponding Japanese Application No. 2010-52305 dated Aug. 28, 2012.
Office Action for Corresponding Australian Application No. 2008299577 dated May 23, 2012.
Office Action for Corresponding Japanese Application No. 2010-524306 dated Oct. 2, 2012.
Meyer, Fernand "An Overview of Morphological Segmentation" *International Journal of Pattern Recognition and Artificial Intelligence*, Nov. 1, 2001 Vo. 15, No. 7, pp. 1089-1118.
Office Action for Corresponding Japanese Application 2010-524307 dated Feb. 5, 2013.
Office Action for Corresponding European Application 08799989.2 dated Jan. 7, 2013.
Office Actionfor Corresponding European Application 08799989.2 dated Oct. 27, 2011.
Office Actionfor Corresponding Australian Application 2008299578 dated Feb. 28, 2013.
U.S. Appl. No. 12/677,756, filed May 9, 2013, Final Office Action.
U.S. Appl. No. 12/677,760, filed May 24, 2013, Office Action.
U.S. Appl. No. 12/677,767, filed Dec. 4, 2012, Office Action.
Office Action for Corresponding Japanese Application 2010-524305 dated Sep. 10, 2013.
Extended European Search Report from PCT/AU2008/001343 completed Sep. 13, 2013.
U.S. Appl. No. 12/677,767, filed Aug. 5, 2013, Final Office Action.
U.S. Appl. No. 12/677,760, filed Nov. 27, 2013, Final Office Action.
U.S. Appl. No. 12/677,756, filed Dec. 26, 2013, Notice of Allowance.
U.S. Appl. No. 12/677,767, filed Mar. 4, 2014, Office Action.
U.S. Appl. No. 12/677,760, filed Nov. 19, 2014.
U.S. Appl. No. 12/677,767, filed Dec. 16, 2014, Notice of Allowance.
Office Action for Corresponding European Application 08799988.4 dated Jul. 18, 2012.
Office Action for Corresponding Australian Application 2008299576 dated Mar. 6, 2014.
International Search Report for PCT/AU2008/001342 dated Nov. 19, 2008.
International Search Report for PCT/AU2008/001345 dated Nov. 21, 2008.
International Search Report for PCT/AU2008/001344 dated Nov. 5, 2008.
International Search Report for PCT/AU2008/001343 dated Oct. 24, 2008.
U.S. Appl. No. 12/677,767, filed Aug. 27, 2014, Notice of Allowance.

\* cited by examiner

000
SYSTEM AND METHOD FOR CAPTURING DIGITAL IMAGES

TECHNICAL FIELD

The present invention provides a system and method for capturing digital images is disclosed. The system and method is used with a computing device and particularly though not exclusively, used in a digital image capturing and management context.

BACKGROUND OF THE INVENTION

Conventionally, computer users find it useful to capture portions of digital images for the purpose of editing or creating additional digital images. The user may wish to create a separate image that focuses on a particular subject, or the user may wish to combine a group of images in a specific arrangement.

Traditionally, for a computer user to create a new digital image from existing digital images, the user must go through a number of complex and tedious steps. This may include opening a digital image utilising suitable digital image editing software and then using a capture tool to carefully select the portions of the image the user wishes to capture. Thereafter, the user must reshape or resize the image and save the file as a new digital object.

Computer users wishing to combine digital images must load each individual image, form the desired arrangement and then use digital image editing software to tediously bring the combination together. Advanced users who wish to reduce the time taken for the task may use the "printscreen" function, which takes a snapshot of what is displayed on the screen into a storage memory as a new digital image. Whilst this approach is useful, the approach is cumbersome and often cannot provide the user with a useful image, unless the user undertakes further editing.

The conventional methods of capturing digital images are tedious and cumbersome even for an advanced computer user who may not always be familiar with the different types of software and processes required to do this task. Many users will often have unpredictable results with new software or interfaces and many computer users would rather not undertake the task of having to learn to use advanced tools.

SUMMARY OF THE INVENTION

In a first aspect the present invention provides a system for capturing displayed digital images comprising a selection tool utilisable by a user to select at least one portion of at least one displayed image, and a capture routine arranged to reproduce the selected portion, wherein if the selection tool selects only a portion of one image, then the captured image is sourced from a secondary storage source and if the selection tool selects more than one portion of one image, then the captured image is sourced from a primary storage source.

In an embodiment of a system, the selection tool is a frame arranged to define a selection area.

In an embodiment of a system, the user defined selection tool is resizable.

In an embodiment of a system, the preceding claims, wherein the selection tool is rotatable.

In an embodiment of a system, the preceding claims, wherein the capture routine provides feedback to the user.

In an embodiment of a system, the feedback is in the form of a visual animation.

In an embodiment of a system, the feedback is in the form of an audio signal.

In an embodiment of a system, the primary storage is a frame buffer memory.

In an embodiment of a system, the secondary storage is a hard disk.

In an embodiment of a system, the capture routine is arranged to execute on a plurality of threads.

In an embodiment of a system, the captured image is further processed by changing the size or orientation of a viewport relating to the image.

In an embodiment of a system, the captured image is rendered by anisotropic texture filtering.

In accordance with a second aspect the invention provides a method for capturing displayed digital images comprising utilising a selection tool to select at least one portion of at least one image and, initiating a capture routine arranged to reproduce the selected portion, wherein if the selection tool selects only a portion of one image, then the captured image is sourced from a secondary storage source and if the selection tool selects more than one portion of one image, then the captured image is sourced from a primary storage source.

In accordance with a third aspect the present invention provides a system for capturing digital images comprising a computer unit, the computer unit implementing a system according to the first aspect.

In accordance with a fourth aspect the present invention provides a computer program comprising at least one instruction for controlling a computer system to implement a method according to the first aspect.

In accordance with a fifth aspect the present invention provides a computer program comprising at least one instruction for controlling a computer system to implement a method according to the second aspect.

In accordance with a sixth aspect the present invention provides a computer readable medium providing a computer program in accordance with any one of the fourth or fifth aspects.

BRIEF DESCRIPTION OF THE DRAWINGS

Notwithstanding any other forms which may fall within the scope of the present invention, a preferred embodiment will now be described, by way of example only, with reference to the accompanying drawings in which.

DETAILED DESCRIPTION

Figure 1:
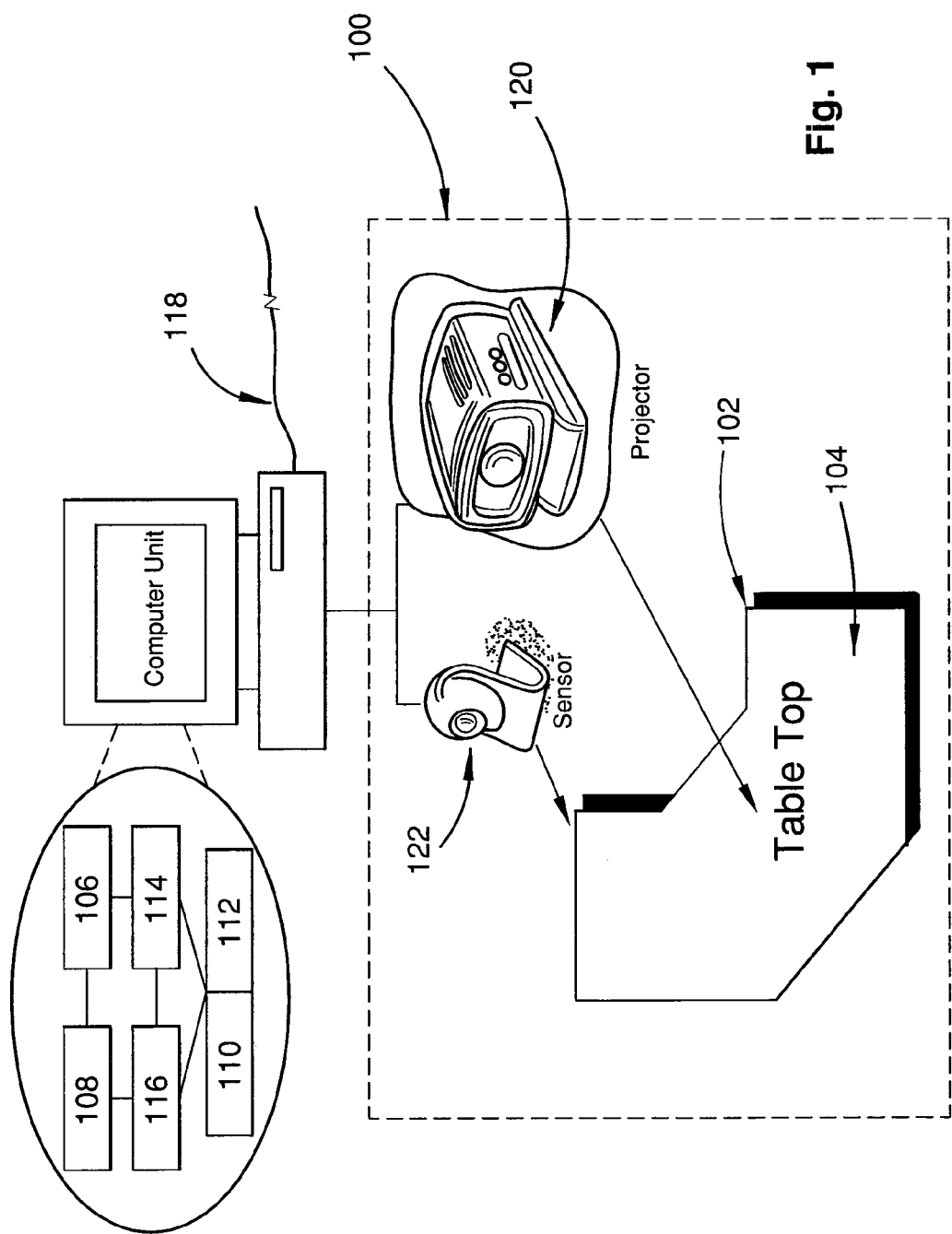
FIG. 1 is a schematic of a computer system utilised to implement an embodiment of the present invention.

With reference to FIG. 1, there is shown a computing system 100 arranged to implement a method in accordance with an embodiment of the present invention. The system 100 is in the form of a personal computer (hereafter "tabletop computer") including a surface-mount display 102. The display 102 is arranged to display a user interface 104 (hereafter "tabletop") and receive user input for capturing digital images displayed thereon. The digital images are sourced from either or both the primary storage 106 or the secondary storage on the computer 108. The system has a software implemented selection frame adapted to select at least one portion of at least one image for capture and a software implemented capture routine, wherein one instance is arranged to reproduce the selected portion of the image from secondary storage to a new image whereupon the selection is a portion wholly from one image. In the second instance, the routine reproduces a plurality of portions of a plurality of images from primary storage into a new image whereupon the user's selection for capture is a plurality of digital images.

To achieve the aforementioned functionality, the tabletop computer 100 comprises computer hardware including a motherboard 110, central processing unit (CPU) 112, graphics processing unit (GPU) 114, read only memory (ROM), primary storage 106 such as random access memory (RAM), registers, cache, RAM exclusively for use by the GPU (e.g. frame buffer), and secondary storage 108 such as disk drives, hard disk, non-volatile memory modules, and input/output devices such as Ethernet ports etc 116. There may also be provided a plurality of communication links which connect to one or more other computing devices, such as servers, personal computers, terminals, wireless or handheld computing devices etc. At least one of the pluralities of communications links may be connected to an external computing network through a telephone line or other type of communications link 118.

The tabletop computer also includes a display including a projector 120 connected to the tabletop computer. The projector projects the user interface onto a surface. The display also includes a sensor 122 capable of detecting user inputs for manipulating objects displayed on the user interface. In an embodiment, the user inputs may comprise hand movements (or gestures) and/or inputs from a stylus or pen.

In addition to the hardware, the tabletop computer includes an operating system (such as the Microsoft Windows XP operating system, which is provided by Microsoft Corporation) that resides on the hard disk and which co-operates with the hardware to provide an environment in which software applications can be executed. In this regard, the tabletop computer 100 is loaded with a digital image capture software application which allows a user to capture a portion of the user interface, such as a portion of a digital image displayed on the user interface, or a plurality of digital images displayed on the user interface. In the embodiment described herein, the digital image is in the form of digital data stored on either a secondary storage device such as, but not limited to, a hard disk, optical drive, or a non volatile memory source (e.g. USB memory device), and/or a primary storage device such as RAM, cache, registers or memory accessible by the graphics processing unit (frame buffer).

The digital image capture application provides the user with a selection frame which is displayed on the tabletop computer display and responds to user manipulation. The frame can be positioned to cover or bound any of the tabletop display and can be resized, rotated or reshaped. The frame can also be placed over a digital image or over a portion of a digital image or over a plurality of portions of digital images on the table top. The selection frame provides a capture action whereby the user can initiate a capture request. When the capture request is made, the capture application invokes a capture routine, whereby the image bounded by the selection frame is reproduced.

Figure 2:
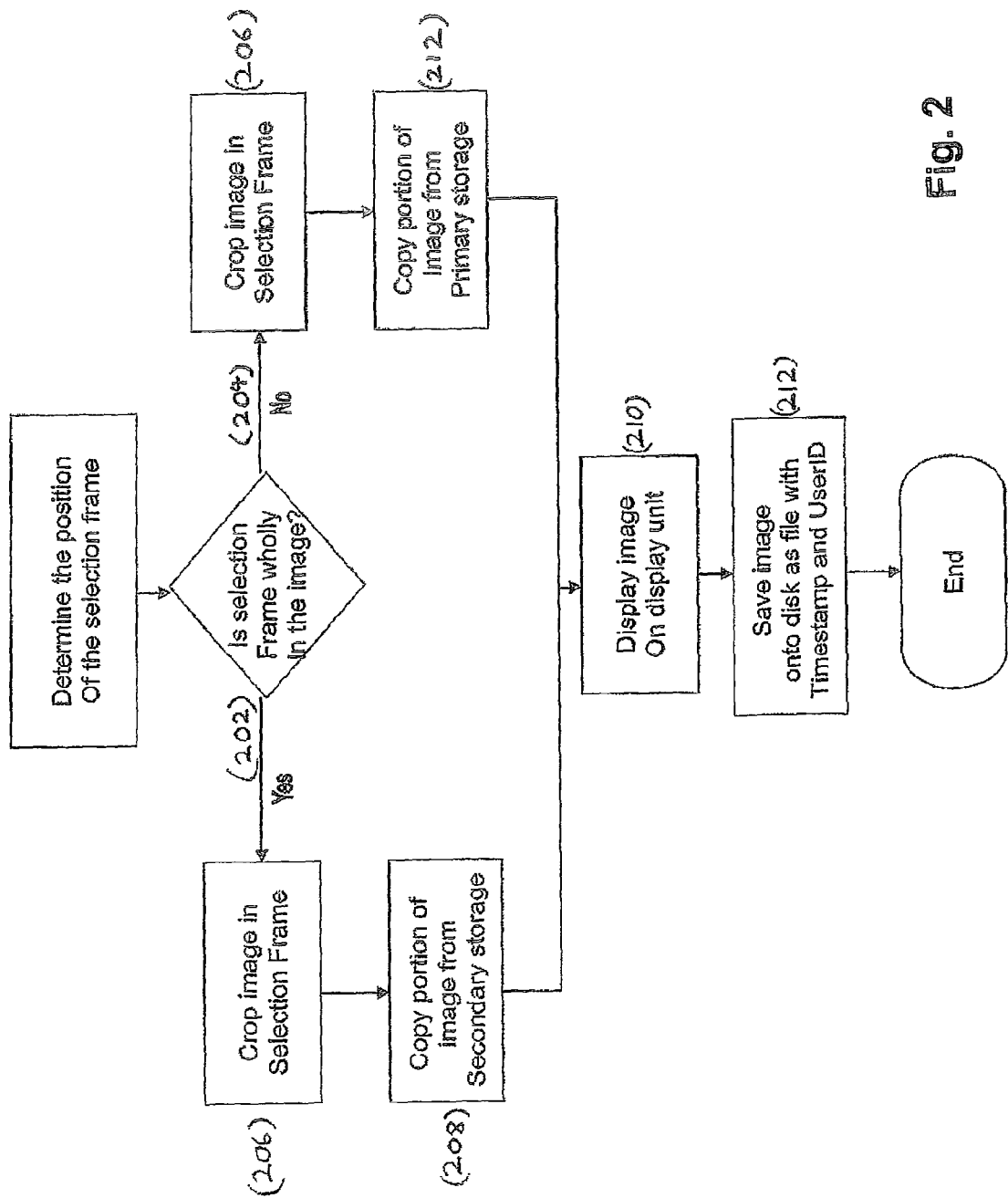
FIG. 2 is a flow diagram showing the method steps for capturing a digital image, in accordance with an embodiment of the present interface.
Figure 3:
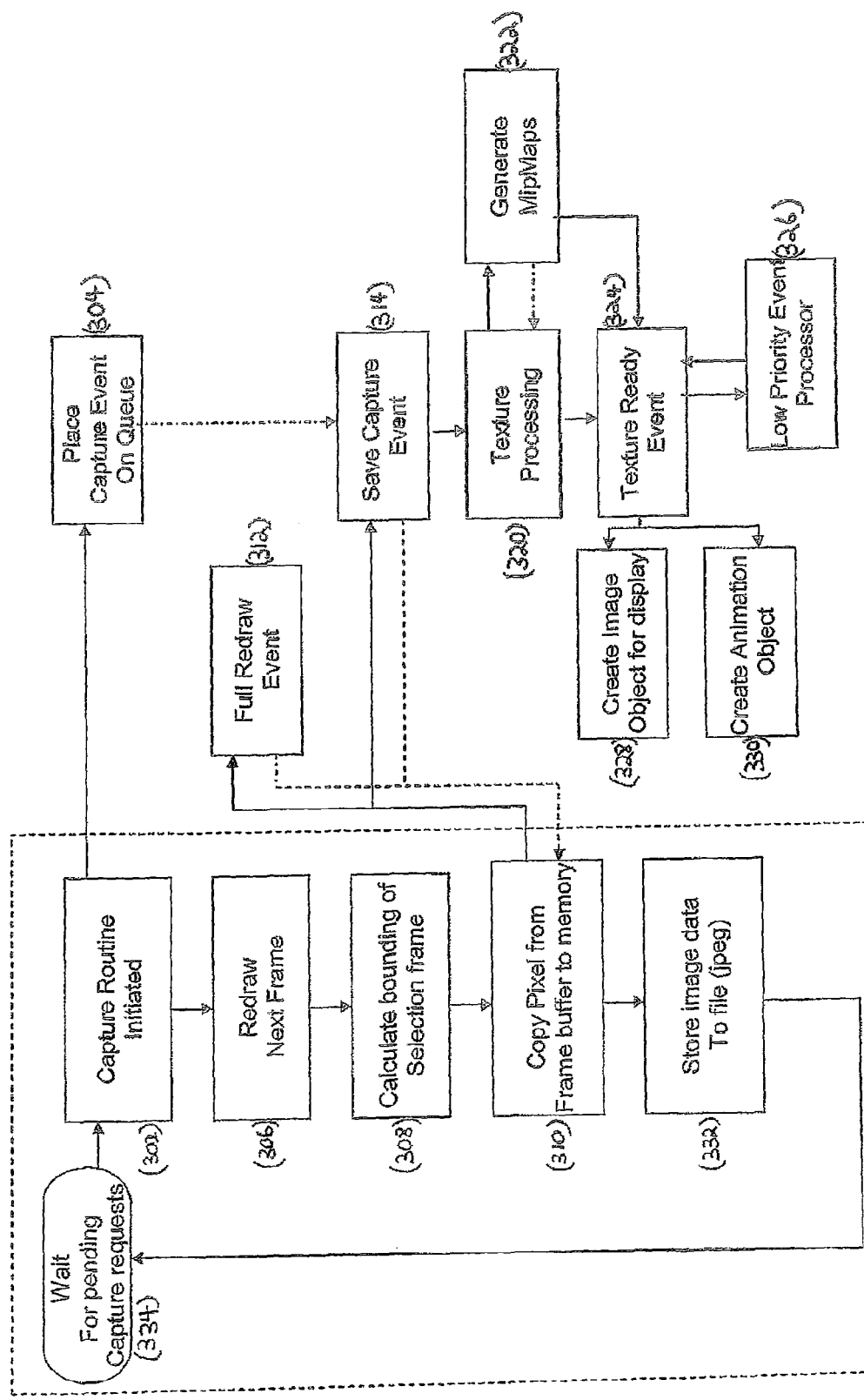
FIG. 3 is a low level flow diagram showing the flow of multitask operations for capturing a digital image, in accordance with an embodiment of the present interface.
Figure 4A:
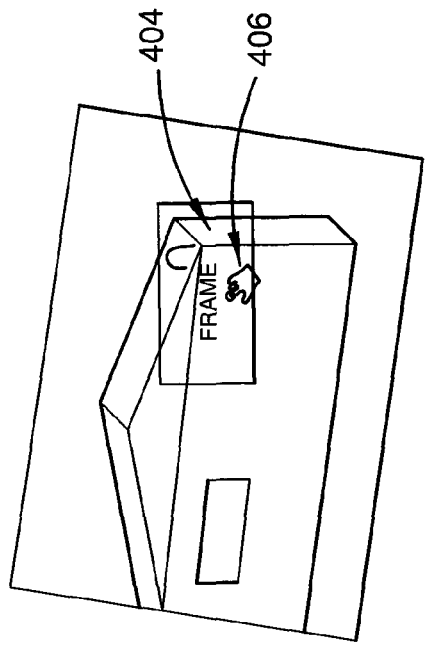
FIGS. 4A to 4D are a series of screen shots of a capture animation, in accordance with an embodiment of the present invention.
Figure 4B:
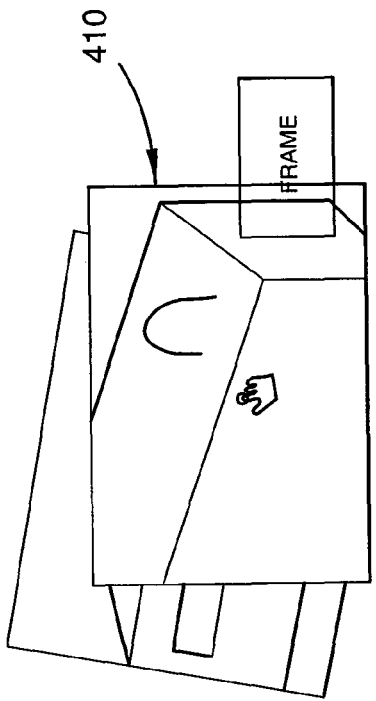
Figure 4C:
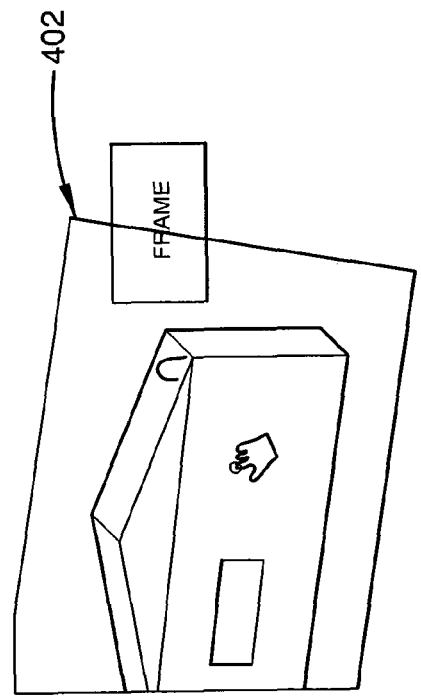
Figure 4D:
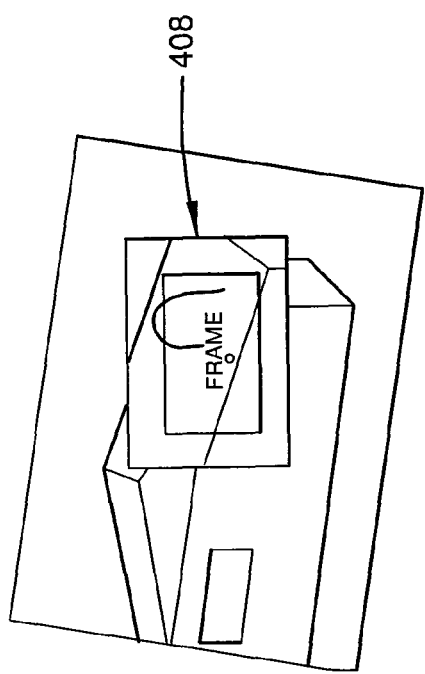
Figure 5B:
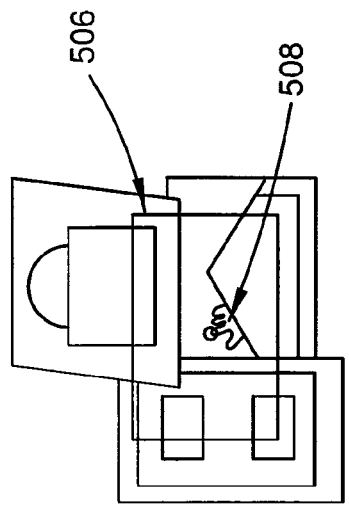
FIGS. 5A to 5D are a series of screen shots of a capture animation, in accordance with an embodiment of the present invention.
Figure 5D:
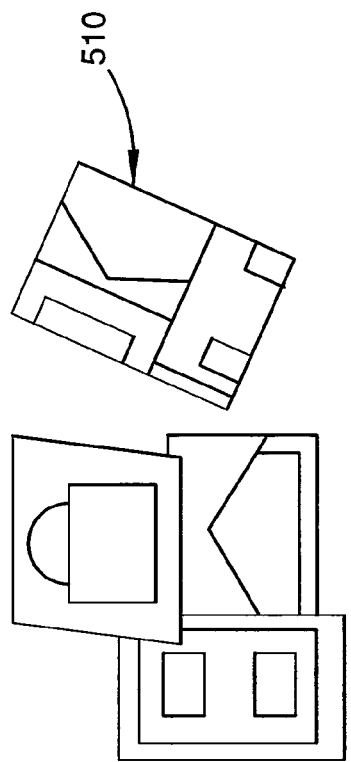
Figure 5A:
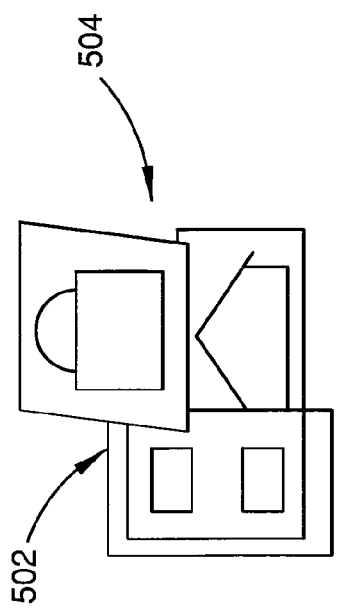
Figure 5C:
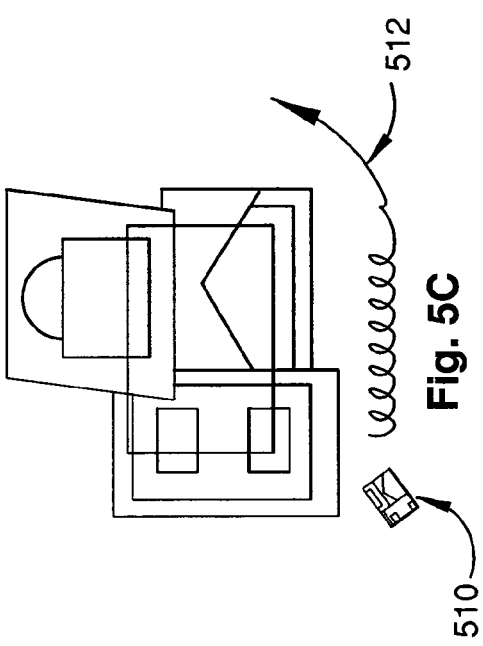

With reference to FIG. 2, the capture routine utilises different types of procedures to reproduce the contents of the selection frame, depending on whether the selection frame is wholly within a displayed digital image 202 or whether the selection frame encumbers a portion of the table top or a portion of other digital images on the table top 204. If the selection frame is wholly within a displayed digital image, the capture routine will crop 206 and reproduce the portion of the digital image within the frame using the digital data in the secondary storage device 208. By using digital data which is contained in a secondary storage device, the reproduced image contains a resolution which is equal to the resolution of the original image. The capture routine will then display the reproduced portion in equal or higher resolution, depending on the intrinsic resolution of the digital data and the amount of storage space available in the secondary storage device.

If the selection is not wholly within a displayed digital image 204, the capture routine crops 206 and reproduces the displayed contents within the selection frame using digital data from the primary storage device 212, such as, but not limited to, a frame buffer, which may be the memory contents addressed by the GPU. This new image has an equal resolution to the resolution of the image displayed on the table top 210.

Following the reproduction of the digital images the capture routine stores the new image produced into a new file and saves the file in the secondary storage 212. During this process, the image may also be displayed onto the table top display for further viewing or manipulation by the user.

This embodiment allows a user to reproduce portions of an image quickly without the complex steps of choosing the resolution levels of captured images and the troublesome, yet crucial process of saving the file. It also provides for the captured image to be concurrently displayed for visual inspection or manipulation by the user without the additional steps of having to reload or reposition the captured image.

In one embodiment, the captured image is created by copying the orthogonally aligned block (e.g. in rectangular, circular or any other shape) of pixels within the boundaries of the selection frame from the frame buffer and loading the pixels as a new image.

In another embodiment, the capture routine is implemented for parallel execution in a multitask environment such that performance of the capture routine provides for a smoother graphical feedback to the user, and thus enhances the ease of use of the table top interface. In this embodiment, when the capture routine is initiated by holding a pen, stylus or finger stationary on the selection frame for more than 1 second 302, a capture event is placed onto the event queue 304. When the scene is next redrawn 306, usually within a few milliseconds, it is drawn without the non-capture objects such as the personal space polygons or menu bars. When the selection frame itself would have been drawn, the capture routine instead calculates the boundaries of the selection frame 308, copies pixels within the partially drawn frame buffer to system memory 310 and enqueues two events, a full redraw to the event queue 312 and a save-capture event 314, which is posted to a thread of execution specifically for encoding screen captures in memory and saving them to secondary storage.

In the main event queue 316, the routine redraws the entire scene and continues to process events as normal. Simultaneously in the save capture thread 314, the routine receives the event via a semaphore post, which points to the copied frame buffer data. This keeps the interactive interface responsive while processor-intensive tasks occur on the frame buffer data in a routine executing in parallel. The routine first performs the texture pre-processing steps 320 on the frame buffer data by scaling it to have dimensions that are the closest powers of two to the original (width, height) and generating mipmaps 322, which are a set of images with dimensions $2^n \times 2^m$, $2^{n-1} \times 2^{m-1}$, ..., 1×1 required for anisotropic filtering; (i.e. to provide an image that can be rapidly rendered in high quality within a 3D scene on a modern graphics card). The mipmaps are kept temporarily in system memory. The texture processing 320 can take some time. For example, if the capture was large, a number of redraws and the processing of other manipulation events may have occurred since the routine was initiated.

Once the texture processing 320 is complete, a low-priority "texture ready" event 324 is placed onto the event queue. Between redraws, if there are no other events (e.g. pen movements), low priority events are processed 326. The texture ready event will transfer the pre-generated mipmaps from system memory into texture memory and create a new Image object 328. An Animation object is created 330 that will move the newly created Image from the corner of the screen to a position on a spiral at the centre of the screen. This occurs in the main thread as other threads cannot access the graphics card. In the background thread, immediately after placing the texture ready event 324, the routine begins converting the captured pixels into a jpeg image 332. First the routine inverts the rows to support an alternate coordinate system, and then converts the image using the open source "libjpeg" library. The image is saved to disk with a time stamp and an identifier which identifies the user that initiated the frame capture. None of this requires access to the graphics card, and so while this process occurs the routine may continue to process input events and redraw the scene with the newly loaded texture. Once the new image is saved to disk, the routine waits 334 on the capture semaphore for the next capture. However, the routine repeats the above processes immediately if there is already a capture event waiting.

In another embodiment, the image may be further processed before display. For example, the frame buffer pixels do not contain all the information that could be obtained from the image data, and the pixel orientation does not reflect the orientation of the selection frame. The routine accommodates for this with minimal computation impact, by changing the size, orientation and shape of the 'viewport' to wholly encompass the selection frame before the first redraw. The 'viewport' is a set of transformation matrices used by the graphics processor to efficiently translate image data in the 3-dimensional "world" coordinate system to the 2-dimensional screen coordinates for display. So, when the user dwells on the selection frame, the action repositions the virtual camera, a reference point in which the graphics displayed on the table top are drawn, resulting in the preservation of the rotation of the digital image. Following this the action captures; saves a composited, full-screen image to disk; and loads it (without actually redrawing the display, so the virtual camera repositioning is not seen by the user). Because the orientation is now important, the representation of the selection frame includes an arrow to indicate "up".

To achieve the repositioning, a point at the centre-top of the frame object is converted to world coordinates to become the desired "top" of the new virtual camera position. The centre of the frame in world coordinates becomes the centre of the new viewport and the virtual camera is positioned at a point in the positive Z-direction from this centre. With these three points (top, centre and eye), the field of view in the vertical, or "y" direction can be calculated as the arccosine of the dot product of the two vectors (centre-eye) and (top-eye), divided by the square of their magnitudes multiplied together. This information, and the aspect ratio of the frame, is sufficient to calculate a temporary viewport for the graphics processor to render a scene with the display contents directly under the frame filling the frame buffer entirely.

This embodiment solves the orientation problem and improves image quality when the selection frame is small. It also requires very little additional computational overhead, and produces images the same size as the screen (e.g. 1024× 768) to save on disk, this is sufficient as any larger sizes would be impractical for most purposes for what the saved frames were intended for (e.g. attaching to email).

As a way of illustrating an implementation of this embodiment, without limitation, a listing of code for one method of implementation is provided in Annexure 1.

In another embodiment, the routine detects whether the selection frame is wholly contained in another Image (i.e. the routine is performing a crop of a single image). If it is not, the routine keeps the virtual camera-reposition image created, loads it into texture memory and stops. Otherwise, the routine still keeps this image and saves it to disk (as it is a low-quality version of the eventual result), but the routine performs further processing. To detect containment, the routine determines whether the same image is located at the centre, and at all four corners of the selection frame by selecting the object at those pixels, ignoring the selection frame itself. At the same time, the routine determines where (what offsets) in the digital image the corners are, thus determining offsets into that digital image's texture. It follows that instead of loading the screen-grab (which is still saved to secondary storage devices), the routine instead loads a special Resource that shares the texture of the target image, but uses the texture offsets previously found. To display this new image, the routine creates a display list that shares the texture with the image captured but, rather than binding points (0,0), (0,1), (1,1), (1,0) of the texture, the routine binds the points of the corners of the Capture selection frame, translated onto the image that is being captured. As a way of illustrating an implementation of this embodiment, without limitation, a listing of code for one method of implementation is provided in Annexure 2.

With reference to annexure, the routine returns a Boolean indicating whether the selection frame is wholly within the displayed digital image. If it is, the object coordinates for displayed digital image that correspond to where the corners of the selection frame lie are returned to the caller in the first argument—these may then easily be translated into texture offsets for the displayed digital image texture. First, the routine creates object coordinates for the corners of the selection frame, relative to the selection frame—these are the four points (±a/2, ±1/2), where 'a' is the aspect ratio of the selection frame. We first convert these to world coordinates, using the cached transformation matrices used to position selection frame in the virtual environment, then convert them to source-object coordinates using the inverse of the transformation matrices used to position displayed digital image in the virtual environment. If any of these transformed points is outside the bounds of the object coordinates for the displayed digital image (i.e. outside the range (±a/2, ±1/2), with 'a' the aspect of the displayed digital image) the routine knows that the corners of selection frame are not wholly contained within displayed digital image. Once the routine has these points, they are used to bind the corresponding points of the existing texture in the displayed digital image to the corners of a newly created "referenced" Image that the routine loads at the same position as the selection frame, with an animation. This new "referenced" Image is initially given the same dimensions and aspect of the capture frame, and appears at the same location. Its contents are exactly what lie beneath it, so to make the new image stand out, it is given an animation. In one embodiment, this animation increases the scale of the new Image by some factor, gradually over one second. Thus the new Image appears to "grow" out of the underlying image, once the capture frame is activated. Without limitations, this behaviour is shown in FIG. 4A-4D.

In a further embodiment, the routine can obtain the full details from the original digital image file, this is particularly useful for a "zoom-in" request. This embodiment offers improvement as texture detail beyond a 1024×1024 resolution is discarded when the original file is loaded. Hence, for greater detail, the routine refers to the file on the secondary storage device. However, the routine can no longer use the graphics card for the clipping, scaling, rotating and compositing of the images that compose the area beneath the selection frame object. The routine uses a program such as "convert" from the open source ImageMagick toolkit to perform these tasks by manipulating the files on the secondary storage device.

In this embodiment, the routine has access to the image file on disk, then after loading the referenced Image, the routine formulates a 3-step transformation for the convert program from ImageMagick, as discussed above. This involves a crop to the bounding box of the rotation (to speed up the next stage), a rotation, followed by another crop. This results in a new file on disk, made from the original image rather then the textures in memory—that is, the best data available. Once the operation completes, the routine reloads the newly created image off the secondary storage device. Notably in this embodiment, the routine crops twice—crop is a much faster operation to perform than rotate, and so the routine performs an initial crop to reduce to the minimum number of pixels that are required to perform the rotate. The result has "waste" where rotated parts now lie outside the final crop, which are subsequently removed. The values off[0].x, off[0].y . . . off [3].x, off[3].y are the texture offsets (each in the range [0.0, 1.0]) that were found from the Texture Offsets calculations discussed earlier. As a way of illustrating an implementation of this embodiment, without limitations, a listing of code for one method of implementation is provided in Annexure 3.

With reference to FIG. 4A to 4D, to use the capture system, a user may first arrange to have the original digital images displayed on the table top display 402, this can be done by loading the image from the secondary storage and the projector will display the digital images on the table top. In one instance, the user may choose a particular image that comprises three notable subjects (e.g. the three features of a house) and wishes to create a new image of only one subject, and thereby providing a new image with more details for that one subject, such as better defined features of the wall. The user may by using a stylus, pen or finger position the selection frame over the specific subject (e.g. the wall) through the dragging or directing with input the selection frame over the table top 404. The user then provides instructions to initiate the capture routine, such as by dwelling on the frame with a stylus, pen or finger 406. Upon which a new digital image is loaded consisting of the area that was below the selection frame 408. In this instance, as the selection frame was wholly within the digital image, the new digital image is larger and has more details since the digital image was reproduced from the secondary storage device 410, where the original digital image is stored in a much higher resolution file than what is stored in the frame buffer. This new digital image is then saved automatically into the secondary storage device as a new file, and will only comprise of the subject, which can be used as a new image for further capturing or other uses. In this embodiment, the user is able to quickly produce a capture of a portion of a digital image quickly in a minimum number of steps. The ease of which the new image is displayed and saved as a file is demonstrated by the basic input required for the entire process. The new image is also displayed in an enlarged formate on the table top to allow for immediate visual inspection of additional details.

With reference to FIG. 5A to 5D, the user may also wish to capture a combination of original digital images displayed on the table top display 502. In this instance, the user may have a plurality of images arranged in a specific order on the table top display 504. Using the selection frame, the user positions the frame to enclose portions of each original digital image displayed 506. The user may resize or rotate the selection frame to capture each of the original digital images as desired. There may also be part of the table top background that is within the selection frame as there may be spaces between the original digital images. Having positioned the frame, the user provides instructions to initiate the capture routine 508. A new image is loaded consisting of the area that was below the selection frame, including any portions of the table top background that may be below the selection frame 510. As the selection frame was not wholly within one digital image, the new digital image will be reproduced from the frame buffer, after repositioning the virtual camera and redrawing so that the captured contents fill the tabletop display. The virtual camera is returned to its original position and the display drawn again before activating the frame buffer, so this repositioning is not noticed by the user. The new digital image is displayed initially as an animation of the image spiralling towards the table top from the corner 512, and finally coming to rest on the table top where the user can select the image. This new digital image is then saved automatically into the secondary storage device as a new file, which can be used as a new image for further capturing or other uses. In this embodiment, the user is able to quickly produce a combination capture of a plurality of portions of a plurality of digital images quickly in a minimum number of steps. The ease of which the new image is displayed and saved as a file is demonstrated by the basic input required for the entire process. The new image is also displayed with an animation process which allows the user to visually track the new image as it comes to be displayed on the table top.

Although the display described above was in the form of a surface displaying a projected image, it will be understood that the display can take any form. For example, the display may take the form of a touch-screen display or may simply be a conventional display where inputs to the display are received by traditional inputs such as a keyboard and mouse.

Although not required, the embodiments described with reference to the Figures can be implemented via an application programming interface (API) or as a series of libraries, for use by a developer, and can be included within another software application, such as a terminal or personal computer operating system or a portable computing device operating system. Generally, as program modules include routines, programs, objects, components, and data files that perform or assist in the performance of particular functions, it will be understood that the functionality of the software application may be distributed across a number of routines, objects and components to achieve the same functionality as the embodiment described and the broader invention claimed herein. Such variations and modifications are within the purview of those skilled in the art.

ANNEXURE 1

```
1
2   void Camera::fillView(const Pt &centre, const Pt &top, double
    aspect) {
3       current.eye = current.ctr = centre;
4       current.eye.z += RConfig::ENV_CAMERA_HEIGHT;
5       current.aspect = aspect;
6       Pt forward = current.ctr - current.eye;
7       Pt upward = top - current.eye;
8       double costheta = forward.dot (upward)
9           / ( sqrt(forward.lensq( ))*sqrt(upward.lensq( )));
10      current.fovy = RAD2DEG * acos(costheta);
11      current.up = top - centre;
12  }
13
14  DWELL_STATUS SmartFrame::dwell(int scr_x, int scr_y,
15              unsigned user, double movement) {
16      checkOverlap( );
17      Camera *c = env->getCamera( );
18      P3<GLfloat> up;
19      toWorld(up, P3<GLfloat>(0.0, 1.0, 0.0));
20      c->pushView( );
21      c->fillView(position, up, aspect);
22      return FramePic::dwell(scv_x, scr_y, user, movement);
23  }
```

ANNEXURE 2

```
1   bool SubTexImage::findSourceCoords(P3<GLfloat>
    (&obj_source)[4],
2                           Image *source,
3                           SmartFrame *creator) {
4       GLfloat creator_aspect = creator->getAspect( );
5       GLfloat source_aspect = source->getAspect( );
6       P3<GLfloat> obj_creator[4];
7       P3<GLfloat> world_creator[4];
8
9       obj_creator [0].set(-0.5*creator_aspect, -0.5, 0.0);
10      obj_creator [1].set( 0.5*creator_aspect, -0.5, 0.0);
11      obj_creator [2].set( 0.5*creator_aspect,  0.5, 0.0);
12      obj_creator [3].set(-0.5*creator_aspect,  0.5, 0.0);
13
14      for (unsigned i = 0; i < 4; ++i) {
15          creator->toWorld(world_creator[1], obj_creator[i]);
16          world_creator[i].z = 0;
17          source->toObject(obj_source[i], world_creator[i]);
18          if  (fabsf(obj_source[i].x) > 0.5*source_aspect
19              || fabsf(obj_source[i].y) > 0.5) {
20              return false; //a corner did not hit - reject
21          }
22          obj_source[i].z = 0; obj_source[i].y*=-1;
23      }
24      return true; //all 4 corners hit
25  }
```

ANNEXURE 3

```
1   int SubTexImage::convert_upgrade_async( ) {
2       GLfloat radsrotated , xw, xh;
3       std::ostringstream crop1, rot, crop2, command;
4       std::string fname = fileName;
5       {
6           /* Step 1: crop to bounding box */
7           std::vector<GLfloat> xs(4), ys(4);
8           for (size_t i = 0; i < 4; ++i) {
9               xs[i] = off[i].x;
10              ys[i] = off [i].y;
11          }
12          std::sort(xs.begin( ), xs.end( ));
13          std::sort(ys.begin( ), ys.end( ));
14          crop1 << " -crop,,"
15              << (xw = (xs[3] - xs[0])*source->width) << 'x'
16              << (xh = (ys[3] - ys[0])*source->height) <<
```

ANNEXURE 3 -continued

```
17              '+' << xs[0]*source->width <<
18              '+' << ys[0]*source->height;
19      }
20      {
21          /* Step 2: rotate */
22          rot << " -rotate "
23              << (radsrotated = atan2f(  off[0].y - off[3].y,
24                                         off[0].x - off[3].x))
25              * -RAD2DEG + 90;
26      }
27      {
28          /* step 3: re-crop centres are all the same point, so reuse */
29          GLfloat w = distf(   (off[1].y - off[0].y)*source->height,
30                               (off[1].x - off[0].x)*source->width);
31          GLfloat h = distf(   (off[2].y - off[1].y)*source->height,
32                               (off[2].x - off[1].x)*source->width);
33          /* now where do we put it: depends how big it is *now* */
34          crop2 << " -gravity Center -crop "
35              << w << 'x' << h << "+0+0";
36      }
37      {
38          const size_t trim = strlen(QUICKCROP ".jpg");
39          /* step 4: figure out a new filename */
40          if (fname.size( ) > trim)
41              fname = fname.substr(0, fname.size( ) - trim) + "
                .jpg";
42      }
43      int rval;
44      //need a temporary image for convert
45      command << PATH_TO_CONVERT
46              << " \"" << source->fileName << "\""
47              << crop1.str( ) << rot.str( ) << '_' << fname;
48      rval = system(command.str( ).c_str( ));
49      if (rval)
50          return rval;
51      command.str("");
52      command << PATH_TO_CONVERT << ' '
53              << fname
54              << crop2.str( ) << ' '
55              << fname;
56      rval = system(command.str( ).c_str( ));
57      if (rval)
58          return rval;
59      if (!load(fname)) /* load the newly created image off disk */
60          return 1;
61      upgraded = true;
62      pushMemberEvent(&Image::reload, Image::Ref(this), true);
63      return rval;
64  }
```

The invention claimed is:

1. A system for capturing and reproducing a portion of a digital image comprising:
   a user interface containing at least one displayed image; and
   a selection tool utilisable by a user to select at least a portion of the at least one displayed image for reproduction; and
   a capture routine arranged to retrieve digital data representing the selected portion of the at least one displayed image, wherein:
      if the selected portion of the at least one displayed image is wholly contained within one image, then the digital data defining the selected portion is sourced from a secondary storage source, the image data in the secondary storage source being both an original digital image file and stored in a non-volatile storage source at a resolution higher than the displayed image, and
      if the selection tool selects a portion of the at least one displayed image which is not wholly contained within one image, then the digital data defining the selection portion is sourced from a primary storage source that stores data as displayed on the user interface, the image data in the primary storage source having a resolution equal to that of the displayed image; and a reproduction tool to reproduce the selected portion of the at least one displayed image from the retrieved digital data.

2. A system according to claim 1, wherein the selection tool is a frame arranged to define a selection area.

3. A system according to claim 1, wherein the user defined selection tool is resizable.

4. A system according to claim 1, wherein the selection tool is rotatable.

5. A system according to claim 1, wherein the capture routine provides feedback to the user.

6. A system according to claim 5, wherein the feedback is in the form of a visual animation.

7. A system according to claim 5, wherein the feedback is in the form of an audio signal.

8. A system according to claim 1, wherein the primary storage is a frame buffer memory.

9. A system according to claim 1, wherein the secondary storage is a hard disk.

10. A system according to claim 1, wherein the capture routine is arranged to execute on a plurality of threads.

11. A system according to claim 1, wherein the digital data defining the selected portion is further processed by changing the size or orientation of a viewport relating to the image.

12. A system according to claim 1, wherein the digital data defining the selected portion is rendered by anisotropic texture filtering.

13. A system for capturing digital images comprising a computer unit, the computer unit implementing a system according to claim 1.

14. One or more computer storage devices having stored thereon computer-executable instructions, which, when executed by at least one processor, implement a method according to claim 1.

15. The system according to claim 1 wherein the primary storage source is a frame buffer.

16. A method for capturing displayed digital images comprising:

utilising a selection tool to select at least one portion of at least one image for reproduction; and initiating a capture routine arranged to retrieve digital data representing the selected portion of the at least one image, wherein:

if the selected portion of the at least one image is wholly contained within one image, then the digital data defining the selected portion is sourced from a secondary storage source, the image data in the secondary storage source being both an original digital image file and being stored in a non-volatile storage source at a resolution higher than that of the displayed image, and if the selection tool selects a portion of the at least one image which is not wholly contained within one image, then the digital data defining the selected portion is sourced from a primary storage source that stores data as displayed on the user interface, the image data in the primary storage source having a resolution equal to that of the displayed image; and a reproduction tool to reproduce the selected portion of the at least one image from the retrieved digital data.

17. A method according to claim 16, wherein the selection tool is a frame arranged to define a selection area.

18. A method according to claim 16, wherein the user defined selection tool is resizable.

19. A method according to claim 16, wherein the selection tool is rotatable.

20. A method according to claim 16, wherein the capture routine provides feedback to the user.

21. A method according to claim 20, wherein the feedback is in the form of a visual animation.

22. A method according to claim 20, wherein the feedback is in the form of an audio signal.

23. A method according to claim 16, wherein the primary storage is a frame buffer memory.

24. A method according to claim 16, wherein the secondary storage is a hard disk.

25. A method according to claim 16, wherein the capture routine is arranged to execute on a plurality of threads.

26. A method according to claim 16, wherein the digital data defining the selected portion is further processed by changing the size or orientation of a viewport relating to the image.

27. A method according to claim 16, wherein the digital data defining the selected portion can be rendered by anisotropic filtering.

28. One or more computer storage devices having stored thereon computer-executable instructions, which, when executed by at least one processor, implement a method according to claim 16.

29. A system for capturing digital images comprising a computer unit, the computer unit implementing a system according to claim 16.

* * * * *